(12) United States Patent
Sakano

(10) Patent No.: US 6,393,182 B1
(45) Date of Patent: *May 21, 2002

(54) OPTICAL FIBER AND METHOD FOR COUPLING OPTICAL FIBERS

(75) Inventor: Shinji Sakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/712,908

(22) Filed: Nov. 16, 2000

Related U.S. Application Data

(63) Continuation of application No. 09/311,144, filed on May 13, 1999, now Pat. No. 6,173,095, which is a continuation of application No. 08/822,007, filed on Mar. 24, 1997, now Pat. No. 5,930,421.

(30) Foreign Application Priority Data

Mar. 29, 1996 (JP) .............................. 8-076443

(51) Int. Cl.[7] .................................. G02B 6/26
(52) U.S. Cl. ............................. 385/38; 385/31; 385/74; 385/78; 359/341
(58) Field of Search .............................. 385/38, 31, 74, 385/78, 341, 22, 23, 42; 359/341

(56) References Cited

U.S. PATENT DOCUMENTS

| | | | |
|---|---|---|---|
| 4,737,006 A | 4/1988 | Warbrick | 385/33 |
| 4,788,406 A | 11/1988 | Holman et al. | 219/113 |
| 4,807,954 A | 2/1989 | Oyamada et al. | 385/43 |
| 5,096,301 A | 3/1992 | Stanley | 356/73.1 |
| 5,253,312 A | 10/1993 | Payne et al. | 385/31 |
| 5,263,103 A | 11/1993 | Kosinski | 385/31 |
| 5,268,975 A | 12/1993 | Yoshitani et al. | 385/22 |
| 5,308,986 A | 5/1994 | Walker | 385/145 |
| 5,440,420 A | 8/1995 | Mori et al. | 359/341 |
| 5,498,260 A | 3/1996 | Rink et al. | 606/16 |
| 5,521,752 A | 5/1996 | Heidemann et al. | 359/341 |
| 5,594,825 A | 1/1997 | Kawasaki et al. | 385/60 |
| 5,701,375 A | 12/1997 | Duck et al. | 385/74 |
| 5,742,427 A | 4/1998 | Kakui et al. | 359/341 |
| 5,764,833 A | 6/1998 | Kakii et al. | 385/54 |
| 5,930,421 A * | 7/1999 | Sakano | 385/38 |
| 6,173,095 B1 * | 1/2001 | Sakano | 385/38 |

FOREIGN PATENT DOCUMENTS

JP  7-128544  5/1995

* cited by examiner

Primary Examiner—Ellen E. Kim
(74) Attorney, Agent, or Firm—Antonelli, Terry, Stout & Kraus, LLP

(57) ABSTRACT

An optical transmission system having a transmitter which generates an optical signal and amplifies the optical signal, a receiver which receives a transmitted optical signal, and an optical fiber which receives and transmits amplified optical signal from the transmitter to the receiver. The optical fiber is a single-mode optical fiber and has an end face to be optically coupled through physical contact with another optical fiber. A transparent film made of a material having a melting temperature higher than a melting temperature of a material of the single-mode optical fiber is formed on the end face of the single-mode optical fiber.

6 Claims, 8 Drawing Sheets

OPTICAL FIBER AND METHOD FOR COUPLING OPTICAL FIBERS

CROSS REFERENCE TO RELATED APPLICATIONS

This is a continuation of U.S. application Ser. No. 09/311,144, filed May 13, 1999, now U.S. Pat. No. 6,173,095, which is a continuation of U.S. application Ser. No. 08/822,007, filed Mar. 24, 1997, now U.S. Pat. No. 5,930,421, the subject matter of which is incorporated by reference herein.

BACKGROUND OF THE INVENTION

1. Field of the Invention

The present invention relates to an optical fiber having an end face which allows optical coupling with another optical fiber through its physical contact as well as to a method for coupling such optical fibers and, more particularly, to an optical fiber at an output end of a high power optical amplifier, to an optical fiber arrangement for optical transmission, to an optical amplifier including such a fiber, and also to an optical transmission system including such a fiber.

2. Description of the Related Art

FIG. 8 shows an outline of an optical fiber connector. More in detail, an optical connector 800 functions to bring two optical fibers 810 into physical contact for their optical coupling. To this end, a user mounts plugs 81 onto respective end faces of the two optical fibers 810 to be connected, and then tightly screws the plugs into associated screws 802 of an adapter 80 provided at its both sides, whereby the two optical fibers are accurately positioned and coupled. In this case, since the adapter 80 is formed therein with engagement hollows 801, the engagement hollows 801 are engaged to receive associated engagement nails 812 of the plugs 81 to thereby prevent the adapter 80 from being rotated.

The user strips off skin layers of the optical fibers 810 to expose cores (not shown) thereof, and then covers the cores with the plugs 81, at which time the user inserts the fiber cores into associated ferrules 4 of the plugs 81.

FIG. 9 is a cross-sectional view of a major part of a prior art optical connector for optical fibers. The optical connector has such a structure as to be explained below. That is, the refractive index distribution of optical fiber is determined by dopant distribution. The optical fiber is provided in its center part with a core 2, which has a high refractive index and around which a cladding 3 having a low refractive index. Provided further around the cladding is the ferrule 4 (which outer peripheral part is omitted in the drawing) for reinforcement. Thereafter, for the purpose of preventing light reflection at the end face 5 of the fiber, the end face 5 is subjected to an accurate polishing operation to provide a reflection of –40 dB or less at a connection. The silica single mode optical fiber conventionally used, when transmitting light having a wavelength of 1.55 μm therethrough, produces a mode field 10 which has a diameter of about 10 μm that is the same even in the interior portion of the fiber and even at the end portion thereof.

JP-A-7-128544 discloses an invention in which the mode field of an optical fiber at a connection part between a light waveguide and the optical fiber is locally expanded. This invention, which is directed to permanent splice based on melt or adhesion between the waveguide and optical fiber, is different from the present invention which is directed to the repetitive removable connection based on the connector. The emergence of optical amplifier expects that an optical fiber having a high level light output of 20 dBm or more will be used in an optical transmission system. However, it has been recently found that, when dust particles (which will be called merely dust, hereinafter) floating in the air are deposited on the light-exit end face of a usual single mode optical fiber having a light output of 20 dBm or more, the light power converges into the dust, thus resulting in that the end face having the dust deposited thereon bakes and starts to melt.

The process leading to the end face melt is as follows.

The connecting operation of the optical connector involves invasion of dust onto interfaces between the end faces of the optical fibers to be connected. When a light signal is transmitted through the optical fibers, the light is irradiated on the dust invaded into the connected parts of the optical connector. Absorption of the light power into the dust produces heat. The end face melt of the optical fibers is considered to be a phenomenon which is caused by the fact that the produced heat increases the temperature of the end portions of the optical fibers to the melting point or more of the material of the fibers.

When the prior art single-mode optical fiber shown in FIG. 9 has a light power of 20 dBm (100mW), its power density becomes 1300MW/m². Assume that dust deposits on the end face of the silica fiber and the light passing through the fiber is all absorbed into the dust to be changed to heat. Then since silica glass has a thermal conductivity of 19.0W/m/K (at 100 C), a specific heat of 1.04J/g/K and a density of 2.22g/cm³; a time taken for the surface of the silica glass to reach its melting point of 1600 C is 30 sec. That is, the dust remaining at the connector causes the end face to melt in a moment.

In particular, when an abrupt increase of light input power is applied to an optical amplifier, this causes generation of an abnormal high peak light power as a surge, which disadvantageously leads to the fact that the light exit end face of the optical fiber tends to easily bake and melt.

Further, in the case of an optical transmitter having an optical fiber and an optical amplifier built therein, the bake and melt of the end face of the optical fiber results in a failure of the optical transmitter. In the case of an optical transmission system having such an optical transmitter built therein, the bake and melt of the end face of the optical fiber unfavorably leads to a reduction in the reliability of the optical transmission system.

A method for preventing the bake and melt of the end face 5 of the optical fiber is considered to previously connect the adapter 80 and the plugs 81 in a clean room to avoid deposition of dust on the end faces of the optical fibers. However, it is highly difficult to previously connect a transmission line and such a discrete device as an optical amplifier. In addition, the optical fiber, optical amplifier and optical transmission system are often installed at a usual office room, so that temporary removal of the optical connector at the time of installation or maintenance results in deterioration of the reliability of the overall transmission system.

As explained above, in this way, the prior art optical fiber, optical amplifier and optical transmission system, in order that the optical fiber to transmit high power output light, requires the light exit and entrance ends of the optical fiber to be kept clean. To this end, interconnection between the adapter and plugs requires a clean room. In addition, once disconnection and re-connection of the connector at the time of the installation and maintenance disadvantageously involves a possibility that the bake and melt may take place at the end face of the optical fiber. The optical amplifier, in particular, tends to easily bake and melt at the end face of the optical fiber, thus deteriorating the reliability of the optical transmission system.

SUMMARY OF THE INVENTION

It is therefore a first object of the present invention to provide an optical fiber for light transmission which can prevent melt at an end face of the optical fiber and can produce a small light coupling loss when high power output light is passed through the optical fiber.

A second object of the present invention is to provide an optical fiber arrangement which comprises two optical fibers and a connector for connecting the two optical fibers for high-power light coupling, which can prevent bake and melt at an end face or faces of the optical fibers and can produce a small light coupling loss.

A third object of the present invention is to provide an optical amplifier which can output high power light while preventing bake and melt at an end face or faces of optical fibers, with a small light coupling loss.

A fourth object of the present invention is to provide an optical transmission system which, even when high power output light is used as an information signal, can avoid reduction of its reliability with a small light coupling loss.

In accordance with an aspect of the present invention, These objects are attained by providing an optical fiber which has an end face for light coupling through physical contact and in which the end face is provided with an anti-bake function therefor and also with a reflection reducing function upon the light coupling.

The anti-bake function is realized by means (1) and (2) which follow.

(1) In an optical fiber having an end face for light coupling through physical contact with another optical fiber, the field diameter of the end face of the optical fiber is made larger than the field diameter of a transmission line.

(2) In an optical fiber having an end face for light coupling through physical contact with another optical fiber, a transparent film made of material having a thermal conductivity higher than the material of the optical fiber is formed on the end face of the optical fiber, or a transparent film made of material having a melting point higher than the material of the optical fiber is formed on the end face of the optical fiber.

The means (1) and (2) may be realized at the same time or separately.

The reflection reducing function, which is important in forming the transparent film on the end face in the means (2), is realized in the following manner.

In a pair of optical fibers having end faces for light coupling through physical contact, when it is desired to form the aforementioned transparent film on the end face of at least one of the two optical fibers, a total T of thicknesses of the transparent films of the two optical fibers is expressed by an equation which follows.

$$T = \lambda(N + \tfrac{1}{2})/n$$

where $\lambda$ is the wavelength of the light, N is an integer, and n is the refractive index of the transparent film.

With the optical fiber connector and optical transmission system, when such optical fibers are connected, the end face melt can be prevented and the light coupling loss can be reduced.

Further, when such an optical fiber is used at the output side of an optical amplifier, the end face melt can be prevented and the light coupling loss can be minimized.

DESCRIPTION OF THE PREFERRED EMBODIMENTS

Embodiments of the present invention will be explained with reference to the accompanying drawings.

(1) Embodiment 1

Figure 1:
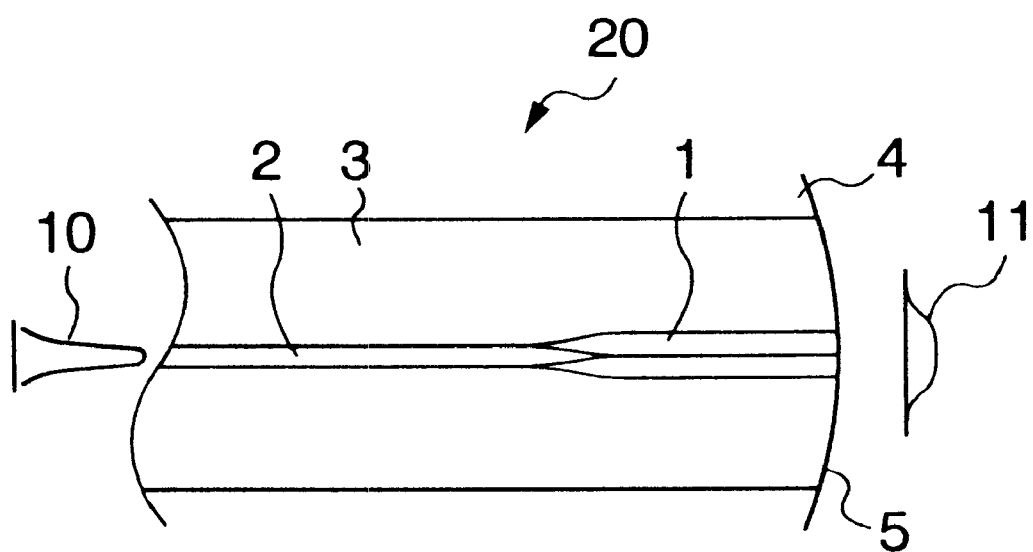
FIG. 1 is a cross-sectional view of a light coupling end of an optical fiber with its mode field expanded in accordance with a first embodiment of the present invention.
Figure 9:
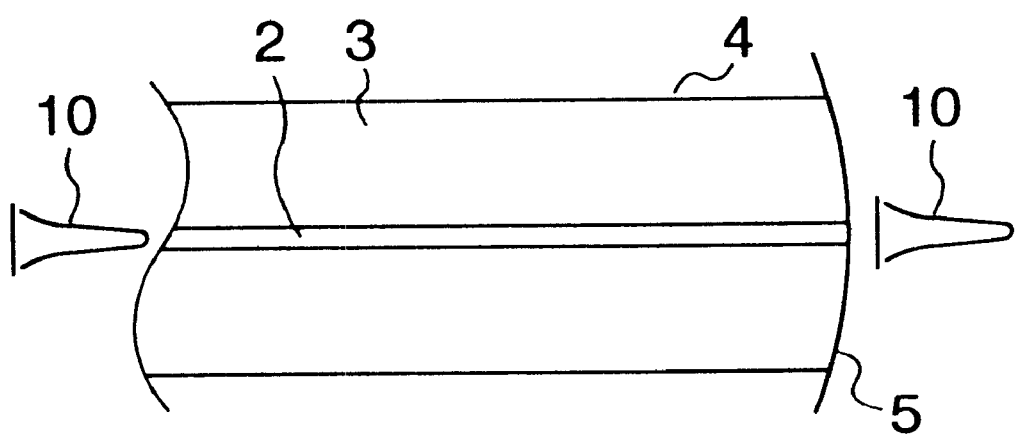
FIG. 9 is a cross-sectional view of a major part of a prior art optical fiber.

An embodiment of an optical fiber as a basic form of the present invention will be explained by referring to FIG. 1. FIG. 1 shows an optical fiber which has an end face 5 to be optically coupled with another optical fiber, to explain a sectional structure of the end of the optical fiber and a mode field distribution of propagation light. As in the prior art example of FIG. 9, the silica single-mode optical fiber, when light having a wavelength of 1.55 $\mu$m is transmitted therethrough, has a mode field 10 of about 10 $\mu$m in portions of the fiber other than the end portion. As already explained above, the refractive index distribution of the optical fiber is determined by the dopant distribution thereof. The optical fiber is made up of a core 2 which is provided in the center of the fiber and which has a high refractive index, a cladding 3 which is provided around the core and which has a low refractive index, and a reinforcing ferrule 4 (which outer periphery is omitted in the drawing) which is provided around the cladding. In the present embodiment, for the purpose of expanding the mode field at a end portion, zone 1 of the fiber close to the end, the diameter of the core close to the end is made smaller and the difference in refractive index between the core 2 and cladding 3 is made small to expand the field diameter in zone 1.

Here is how to form the zone 1 in which the refractive index difference of the optical fiber is made small.

An optical fiber with a uniform diameter core 2 is cut and then an cut end portion of the fiber is heated. This causes dopants determining the refractive index distribution of the heated zone to be diffused, so that the boundary of the refractive index distribution changes and becomes unclear. This heating method is disclosed in JP-A-7-128544. The heating causes the refractive index difference of the zone 1 having the diffused dopants to be decreased, the confinement of light to be made weak, and thus the diameter of the light mode field to be increased. The resultant end portion including the zone with the mode field diameter thus expanded is reinforced with the ferrule 4, and then precisely polished to thereby obtain the end face 5 having a mirror surface.

In the present embodiment, according to the aforementioned method, the diameter of the mode field 10 of 10 μm can be expanded to 25 μm at the end face 5. Since the diameter of a mode field 11 at the end face 5 can be expanded to 25 μm, a power density at the end face 5 can be lowered to 1/6 or less and a light power necessary for the end face melt can be increased by 8dB or more.

(2) Embodiment 2

Explanation will be made in connection with a case, as a second embodiment, where the present invention is applied to an optical connector as a part of an optical fiber transmission system which comprises a high-power optical amplifier and an optical fiber transmission line, by referring to FIGS. 2A and 2B.

Figure 2A:
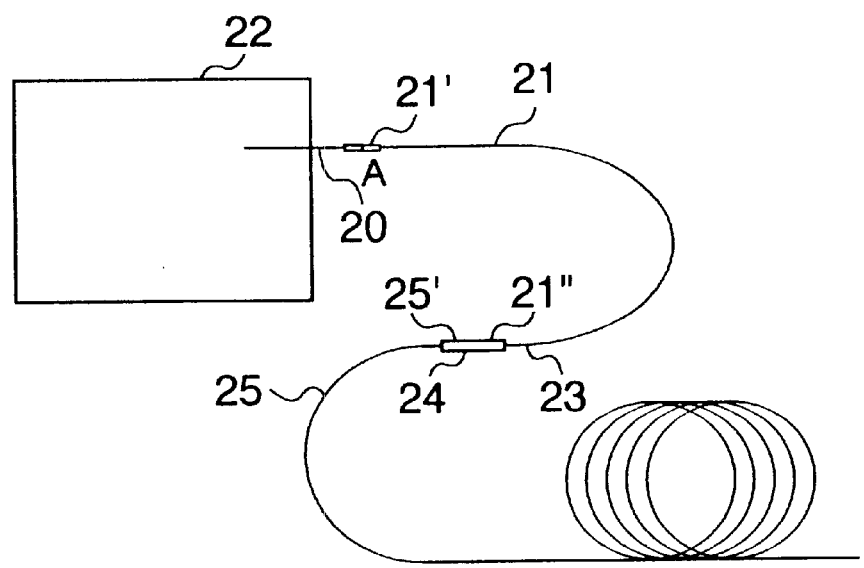
FIGS. 2A and 2B are a schematic diagram of an optical transmission system which includes an high-output optical amplifier and a transmission line and a cross-sectional view of an optical connector used in the system in accordance with a second embodiment of the present invention, respectively.
Figure 2B:
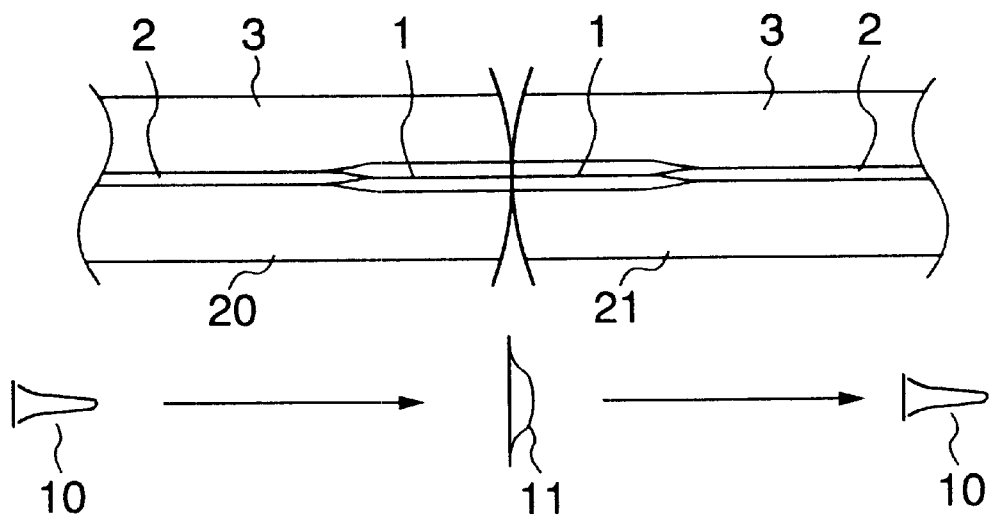

As shown in FIG. 2A, when an optical amplifier 22 is used, the system can produce a light output as high as about 24dBm. When such an optical fiber with the expanded end mode field as exemplified in the foregoing Embodiment 1 is employed as the output optical fiber 20 of the high-power optical amplifier 22, the allowable bake power at the end face can be improved by 8dB and thus bake can be completely avoided.

When the optical fiber 20 is of such a type that the mode field is expanded as in Embodiment 1, the allowable output value for the end face melt can be increased but this also involves another problem of light coupling. That is, it is desirable for the optical fiber to have a small light coupling loss. However, when the fiber with the expanded mode field to avoid the end face melt is connected with a usual single-mode fiber, a large coupling loss takes place. To avoid this, when the fiber with the expanded mode field is connected with the same type of fiber with the expanded mode field as shown in FIG. 2B, the coupling matching can be achieved. When the diameter of the mode field of the optical fiber provided at the input side is set to correspond to the diameter of the mode field of the party fiber to be connected, the coupling loss can be suppressed to a low level.

Schematically shown in FIG. 2A is the optical transmission system which comprises the high-power optical amplifier and the transmission line including the optical fiber of the present invention.

In the present embodiment, similarly to the optical fiber 20 with the expanded mode field at the output side of the optical amplifier 22, there is used a mode-field matching optical fiber 21 which has one end face 21' at which the mode field is expanded. The end face 21' of the matching optical fiber 21 located on the side of the optical amplifier 22 is heated to diffuse dopants present therein and to expand the diameter of the mode field. When such an optical fiber is use as the input-side fiber, the light coupling loss can be suppressed to a low level.

After a single-mode optical-fiber transmission line 25 used as an ordinary transmission line is once laid, it is difficult to conduct the mode-field diameter expanding work over an end 25' of the single-mode optical-fiber transmission line 25. To avoid this, one end face 21' of the mode-field converting optical fiber 21 is subjected to a mode-field expanding work, whereas, the other end 21" is not subjected to any expanding work to have a usual mode field of 10 μm. The other end 21" of the mode-field converting optical fiber 21 having the 10 μm mode field is fused to the end face 25' of the transmission line 25 to form a spliced part 24, thus attaining interconnection between the fiber 21 and the transmission line 25. In this way, the optical fiber 20 at the output side of the high-power optical amplifier 22 can be connected with the transmission line 25 with a low light coupling loss.

As a result, in an optical fiber arrangement including the 2 optical fibers and the connector for coupling of high power light, the end faces of the optical fibers can be prevented from being susceptible to baking and melting and thus the optical fiber arrangement having a small light coupling loss can be realized.

(3) Embodiment 3

As another method for preventing the baking and melting of the end face of the optical fiber, it is considered to coat on the end face a transparent film having a thermal conductivity higher than silica glass. Even when light power converges upon dust and generates heat, high thermal conductivity enables prevention of local temperature rise because the generated heat is widely spread. For this reason, the allowable light power against the end face melt can be made high. To prevent reflection, it is desirable the transparent film to be made of such material as to have a refractive index close to that of the optical fiber. The coating operation is carried out after the optical fiber is inserted into the ferrule to be fixed and the end face is polished.

A third embodiment will be explained in conjunction with FIG. 3.

Figure 3:
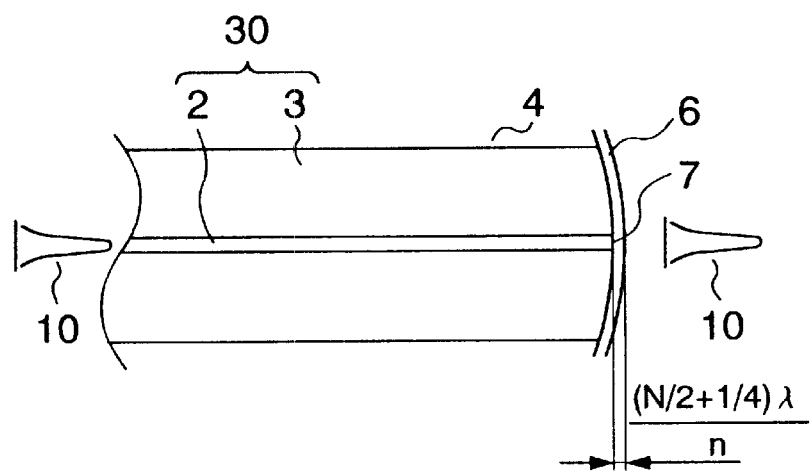
FIG. 3 is a cross-sectional view of a major part of an optical fiber in accordance with a third embodiment of the present invention.

Referring to FIG. 3, there is shown a cross-sectional view of a major part of an optically coupled part of an optical fiber as the embodiment 3 similar to the Embodiment 1 of FIG. 1.

In a system for transmission of light signals having wavelengths of 1.5 μm and 1.3 μm, optical fiber is usually of a silica type. Silica glass 30 as the material of the optical fiber has a thermal conductivity of about 15W/m° C. at room temperature. In the present embodiment, an $Al_2O_3$ coating film 6 having a high thermal conductivity is formed on the end face of the optical fiber. It is already known that the $Al_2O_3$ material is transparent in the aforementioned wavelength band and has a thermal conductivity of 210W/m° C. at room temperature and the conductivity is higher by 1 digit than silica glass even at high temperature. The use of such an $Al_2O_3$ coating film 6, even when dust deposits on the end face of the optical fiber and absorbs all light to generate heat, enables increased spread of thermal diffusion zone when compared with silica glass and thus enables suppression of temperature rise. $TiO_2$ and Si are also transparent in the 1.3 μm and 1.5 μm wavelength lights. They have higher thermal conductivities than $SiO_2$ and they are available for the same object.

Further, the melting point of $Al_2O_3$ is 2015° C. that is 415° C. higher than silica glass. Assume that silica glass has an allowable light power of 100mW. Then when $Al_2O_3$ is employed, the melting point is merely increased and the allowable light power can be increased up to 125mW. In other words, even selection of material having a high melting point as the material of the coating film serves as prevention of the end face melt.

Although the coating of $Al_2O_3$ has been carried out by a sputtering process in the present embodiment, another suitable process such as, e.g., an anodizing process for an Al film or an electron beam evaporation process for $Al_2O_3$ may be employed to obtain the same effects.

(4) Embodiment 4

Explanation will be made as to an optical coupling arrangement as a fourth embodiment, with use of FIG. 3 used in the Embodiment 3 and FIG. 4.

Such coating of $Al_2O_3$ on the end face as mentioned in the Embodiment 3, even if dust deposits on the end face of the fiber and absorbs all light to generate heat, enables enhanced spread of the thermal diffusion zone when compared to silica glass, and thus enables suppression of the temperature rise. When the end face coating is carried out, however, since $Al_2O_3$ has a refractive index of 1.76 when compared to silica glass having a refractive index of 1.45, a reflection of 0.87% (−20.6dB) takes place at an interface 7 between the silica glass and coating film. Further, when this fiber is connected with another fiber subjected to the same fiber end process as the above, a reflection of −17.6dB in the worst takes place. In this case, the reduction of reflection to −40dB or less resulting from precision polishing of the end face becomes meaningless.

To avoid this, that is, to prevent reflection when the coated end faces of the optical fibers are interconnected, a thickness of the coated film is set to $\lambda(N/2+\frac{1}{4})/n$, where $\lambda$ is the wavelength of light, N is an integer, and n is the refractive index of the coating material. When the transmission light has a wavelength of 1.55 μm, the thickness of the $Al_2O_3$ film is 0.22, 0.66, 1.1 or 1.54 μm. Since the $Al_2O_3$ film is preferably thicker from the viewpoint of avoiding baking caused by thermal conduction, it is desirable to select 0.66, 1.1 μm or more.

Figure 4:
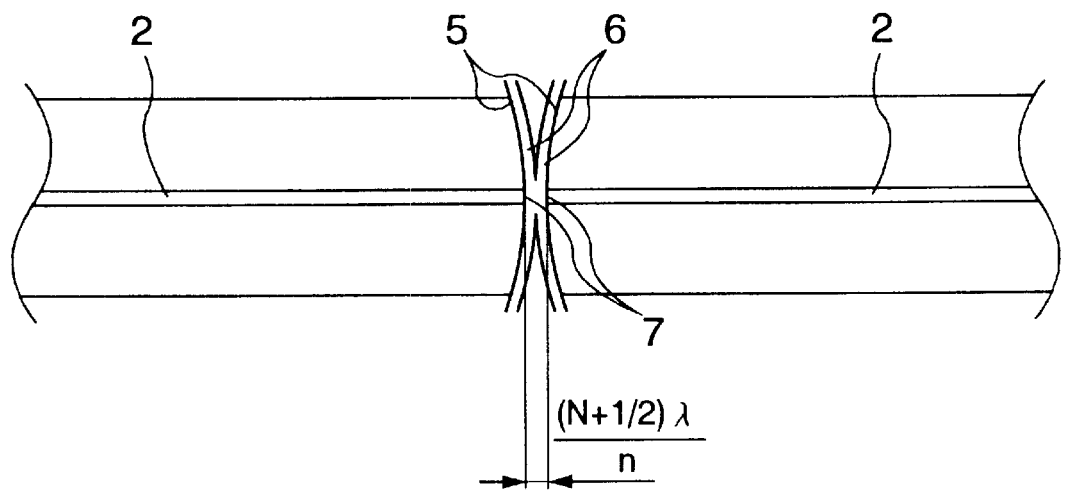
FIG. 4 is a cross-sectional view of an optical connector for connection between optical fibers which end faces are formed with protective coatings in accordance with a fourth embodiment of the present invention.

Shown in FIG. 4 is a cross-sectional view of a major part of optical fibers showing a connected state thereof. As illustrated, when the optical fibers are interconnected, a sum of the thicknesses of the two coating films 6 is expressed by $\lambda(N+\frac{1}{2})/n$. This indicates a non-reflection condition under which multiple reflected waves are canceled one another, no reflection occurs at the interconnected end faces of the fibers.

Embodiment 5

Figure 5:
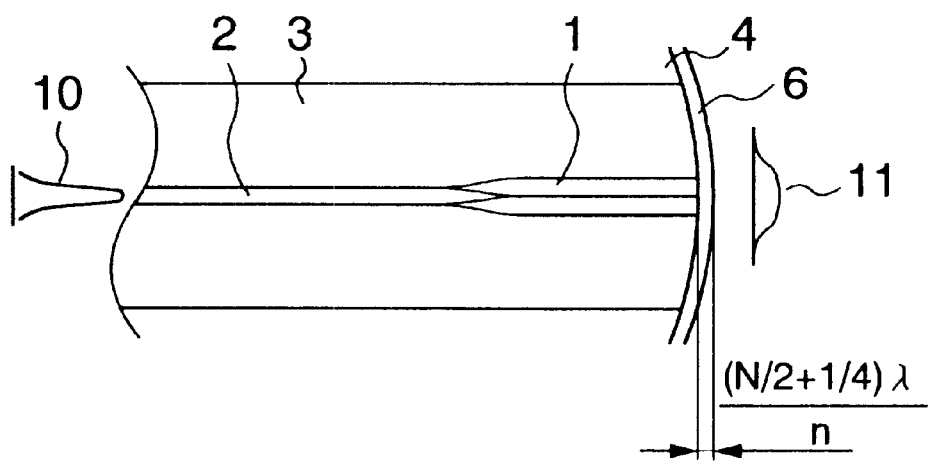
FIG. 5 is a cross-sectional view of a major part of an optical fiber which end is coated with $Al_2O_3$ and which end mode field is expanded in accordance with a fifth embodiment of the present invention.

FIG. 5 shows a cross-sectional view of a major part of an interconnected part of an optical fiber. Explanation will be made as to a fifth embodiment of FIG. 5 in which a mode field at one end of the optical fiber is expanded and $Al_2O_3$ is coated on the end face of the optical fiber.

The embodiment 5 is an example where the optical fiber of the Embodiment 1 is formed on its end face with a coating film as shown in FIG. 5. As in the prior art example of FIG. 9, the silica single-mode optical fiber other than the end face 5 has a mode field 10 of 10 μm in diameter for light having a wavelength of 1.55 μm. By the method already detailed in the Embodiment 1, the diameter of the mode field 10 for the 10 μm light can be expanded to 25 μm at the end face 5. Since the diameter of the mode field 11 at the end face 5 can be expanded to 25 μm, a power density at the end face 5 can be lowered to 1/6 or less and an allowable light power against the end face melt can be increased by 8dB or more. In the present embodiment, in addition, the $Al_2O_3$ coating film 6 having a high thermal conductivity is formed on the end face of the optical fiber. As already known, the $Al_2O_3$ film is transparent in the above wavelength band and has a thermal conductivity of 210W/m° C. at room temperature, and the conductivity is higher by one digit than silica glass at high temperature. For this reason, even if dust deposits on the end face of the fiber and absorbs all the light to generate heat, the formation of the $Al_2O_3$ coating film 6 enables enhanced spread of the thermal diffusion zone when compared to silica glass and thus enables suppression of the temperature rise.

Explanation has been made in connection with the case where the identical thickness of transparent films are coated on the light exit end face of the optical fiber and the light entrance end face of the optical fiber adjacent thereto in the Embodiments 3 to 5. However, the non-reflection condition when the coated end faces are interconnected requires a sum of the thicknesses of the coated films to be ½ of the light wavelength. When the end face of the optical fiber provided at the light entrance side is not formed with the coating film, the thickness of the coating film on the end face of the optical fiber provided at the light exit side is set to be shifted by ½ of the light wavelength. That is, a total T of the thicknesses of the aforementioned transparent films formed on the end faces of the two optical fibers to be interconnected is required to satisfy an equation which follows.

$$T=\lambda(N+\frac{1}{2})/n$$

where $\lambda$ is the wavelength of light, N is an integer, and n is the refractive index of the transparent films.

Though the transparent film has been formed with use of $Al_2O_3$ by the sputtering process in the Embodiments 3 to 5, the present invention is not limited to the specific sputtering process. For example, Al film may be anodized or $Al_2O_3$ electron beam may be evaporated to exhibit the same effects as the above. Further, the transparent film is not restricted to the $Al_2O_3$ film but another transparent film having a high thermal conductivity or a high melting point may be employed to exhibit the same effects as the above.

Embodiment 6

Explanation will be made as to an optical amplifier in accordance with a sixth embodiment of the present invention, by referring to FIG. 6.

Figure 6:
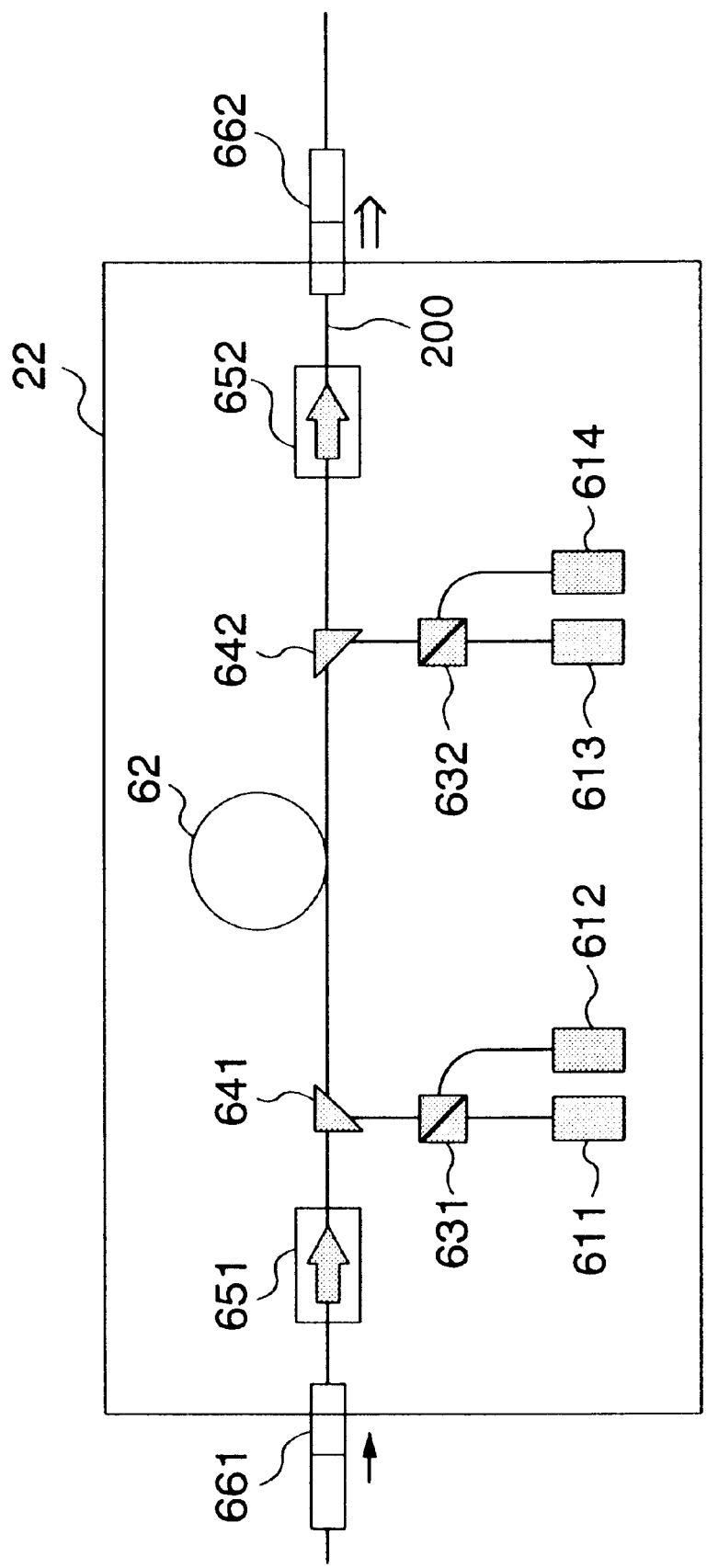
FIG. 6 shows an arrangement of an optical amplifier in accordance with a sixth embodiment of the present invention.

Shown in FIG. 6 is a structure of an optical amplifier 22. The optical amplifier 22 pumps an amplifying optical fiber 62 with use of four pumping lasers 611, 612, 613 and 614. More specifically, the two pumping lasers 611 and 612 are arranged to cause polarized waves from the lasers to be perpendicular to each other on the upstream side of the optical fiber 62, and are connected to the single optical fiber through a polarization division multiplexer 631. The polarization division multiplexer 631 in turn is connected through a wavelength division multiplexer 641 of signal light and pump light to the same optical fiber. Even on the downstream side of the amplifying optical fiber 62, similarly, the two pumping lasers 613 and 614 are connected to the optical fiber through a polarization division multiplexer 632 and a wavelength division multiplexer 642 of signal light and pump light.

Through such a pumping optical system as mentioned above, four pumping laser beams of 100mW×4 are directed to the amplifying optical fiber 62 to obtain a pump light of 400mW. For the purpose of suppressing resonance noise caused by the reflection of the optical connectors 661 and 662 which are fed back to the amplifying optical fiber 62 from optical connectors 661 and 662, optical isolators 651 and 652 are provided on the upstream and downstream sides of the amplifying optical fiber 62. When input signal light of 0dBm is directed into the optical amplifier 22 through the input-end optical connector 661 and amplified, output signal light of 24dBm is output from the output-end optical connector 662.

In this connection, when an optical fiber 200 according to the present invention is employed to the output side of the optical amplifier 22, the end face of the output-side optical fiber 200 can be prevented from being susceptible to baking and melting.

With such an arrangement as mentioned above, there is obtained an optical amplifier which can output a high-power beam while avoiding the bake and melt of the end face of the optical fiber and keeping the light coupling loss small.

Embodiment 7

An optical transmission system as seventh embodiment 7 of the present invention will be explained with reference to FIG. 7.

Figure 7:
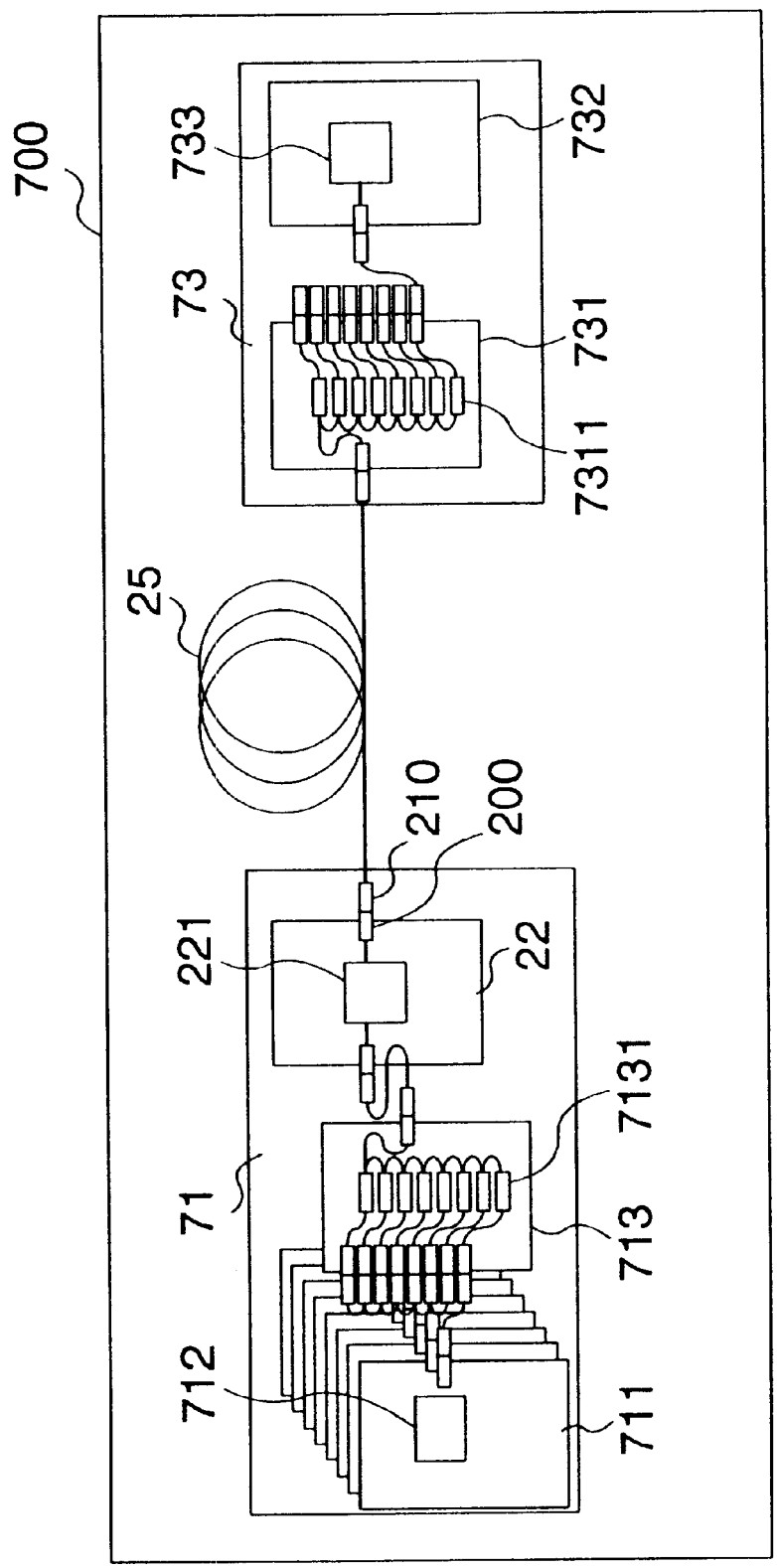
FIG. 7 is an arrangement of an optical transmission system in accordance with a seventh embodiment of the present invention.
Figure 8:
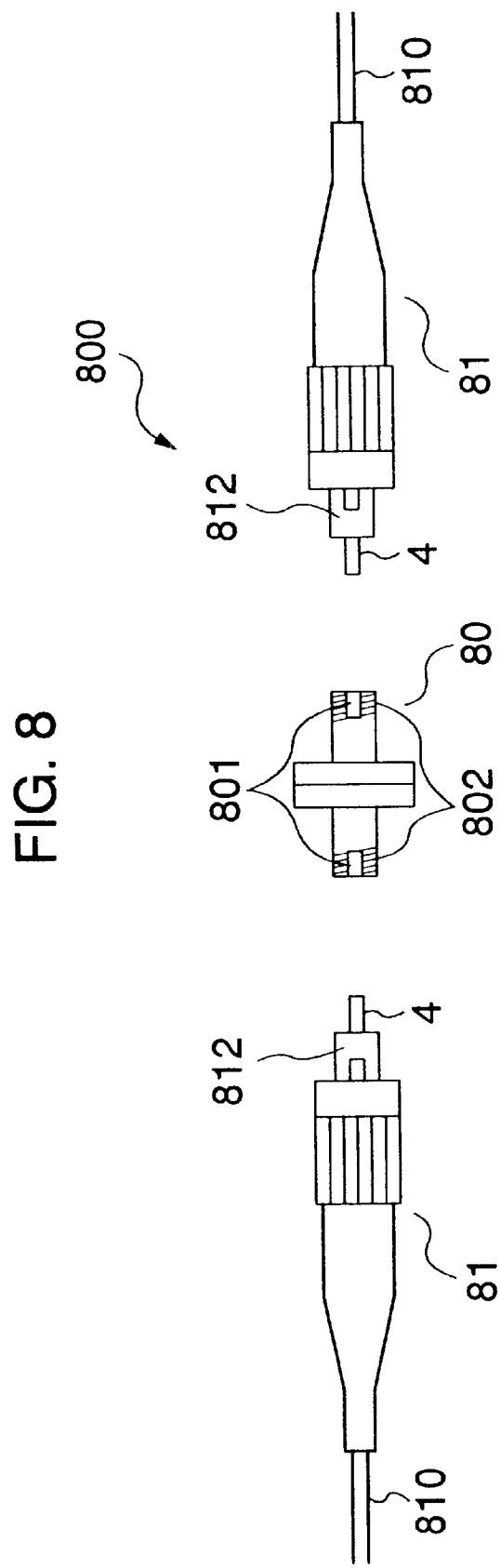
FIG. 8 schematically shows an optical fiber connector.

FIG. 7 shows a configuration of an 8-wavelength multiplexed light transmission system 700. The optical transmission system 700 includes a transmitter 71, an optical fiber transmission line 25 having a length of several ten Km, and a receiver 73. The optical transmitter 71 in turn has an optical transmitter 711 made up of 8 optical transmitting modules 712 having 8 different wavelengths of around 1.55 $\mu$m, wavelength division multiplexer 713 made up of eight wavelength division multiplexing modules 7131 for multiplexing these waves, and a high-power optical amplifier 22. Transmission light already multiplexed at the wavelength division multiplexer 713 is directed into a single optical fiber, amplified by the optical amplifier 22, and then output therefrom. The receiver 73 has a wavelength division demultiplexer 731 and an optical receiver 732. The optical receiver 732 is made up of optical receiving modules 733 (only one of which is illustrated for simplicity of the drawing) for receiving demodulated light signals from the wavelength division demultiplexer 731 and converting it to electric signals. In the receiver 73, the wavelength division demultiplexer 731 demultiplexes an input signal to wavelength-demultiplexed light signals having different wavelengths, and the optical receiver 732 converts the demultiplexed light signals to electric signals.

When the output power of the transmitter 71 per wavelength is made high, a transmission distance can be correspondingly prolonged. When the output power of the transmitter 71 per wavelength is 15dBm, an output power for 8 wavelengths becomes 24dBm. This light output power is obtained by using such a high-power optical amplifier 22 as exemplified in the embodiment 6. When the optical fibers according to the present invention are used for the output-side optical fiber 200 and for the input-side optical fiber 210 of the transmission line, there is obtained a low-loss, reliable optical transmission system which can avoid its end face bake and melt.

The present invention can be applied also to optical fibers made of materials other than silica glass. The present invention may be applied not only to the single-mode fibers but also to multi-mode fibers.

What is claimed is:

1. An optical transmission system, comprising:
   a transmitter which generates an optical signal and amplifies the optical signal;
   a receiver which receives a transmitted optical signal; and
   an optical fiber which receives and transmits the amplified optical signal from the transmitter to the receiver;
   the optical fiber being a single-mode optical fiber and having an end face to be optically coupled through physical contact with another optical fiber; and
   a transparent film made of a material having a melting temperature higher than a melting temperature of a material of the single-mode optical fiber is formed on the end face of the single-mode optical fiber.

2. An optical amplifier according to claim 1, wherein a thickness T of the transparent film satisfies an equation of T=$\lambda$(N/2+¼)/n, where $\lambda$ is a light wavelength, N is an integer and n is a refractive index of the transparent film.

3. An optical amplifier according to claim 1, wherein the material of the transparent film is higher in thermal conductivity than the thermal conductivity of the material of the single-mode optical fiber.

4. An optical transmission system, comprising:
   a transmitter which generates an optical signal and amplifies said optical signal;
   a receiver which receives a transmitted optical signal; and
   a single-mode optical fiber which receives and transmits the amplified optical signal from the transmitter to the receiver;
   wherein the single-mode optical fiber has an input end disposed so to be optically coupled through physical contact; and
   wherein a diameter of a mode field of the input end of the single-mode optical fiber is larger than a diameter of another part of the single-mode optical fiber; and
   wherein a material of a transparent film formed on the input end of the single mode optical fiber is higher in at least one of thermal conductivity and melting point than a thermal conductivity and melting point of a material of the single-mode optical fiber.

5. An optical amplifier according to claim 4, wherein a thickness T of the transparent film satisfies an equation of T=$\lambda$(N/2+¼)/n, where $\lambda$ is a light wavelength, N is an integer and n is a refractive index of the transparent film.

6. An optical amplifier according to claim 4, wherein the material of the transparent film is higher in thermal conductivity than the thermal conductivity of the material of the single-mode optical fiber.

\* \* \* \* \*